Oct. 2, 1956　　　H. A. TOULMIN, JR　　2,764,890
COMBINED LIQUID LEVEL GAUGE AND NAVIGATION AID
Filed Feb. 10, 1954　　　　　　　　　　　　3 Sheets-Sheet 3
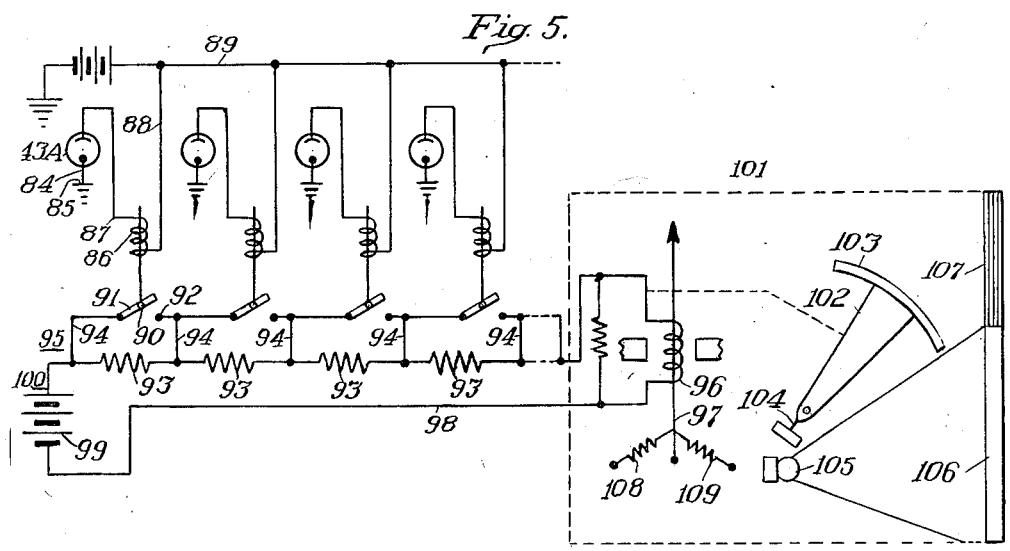
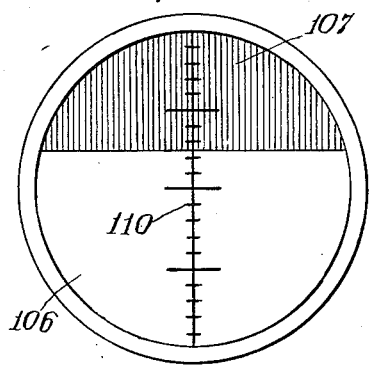
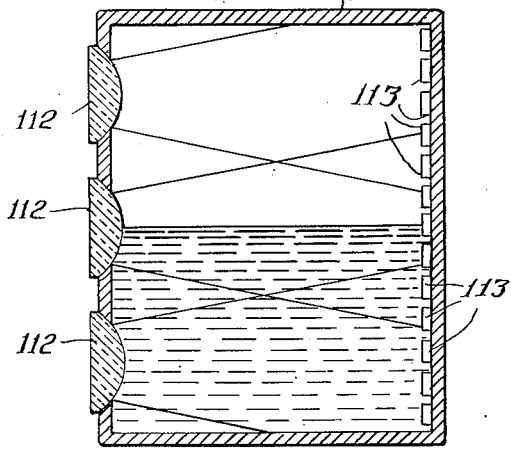
INVENTOR
H. A. Toulmin Jr.
BY
ATTORNEYS United States Patent Office 2,764,890
Patented Oct. 2, 1956

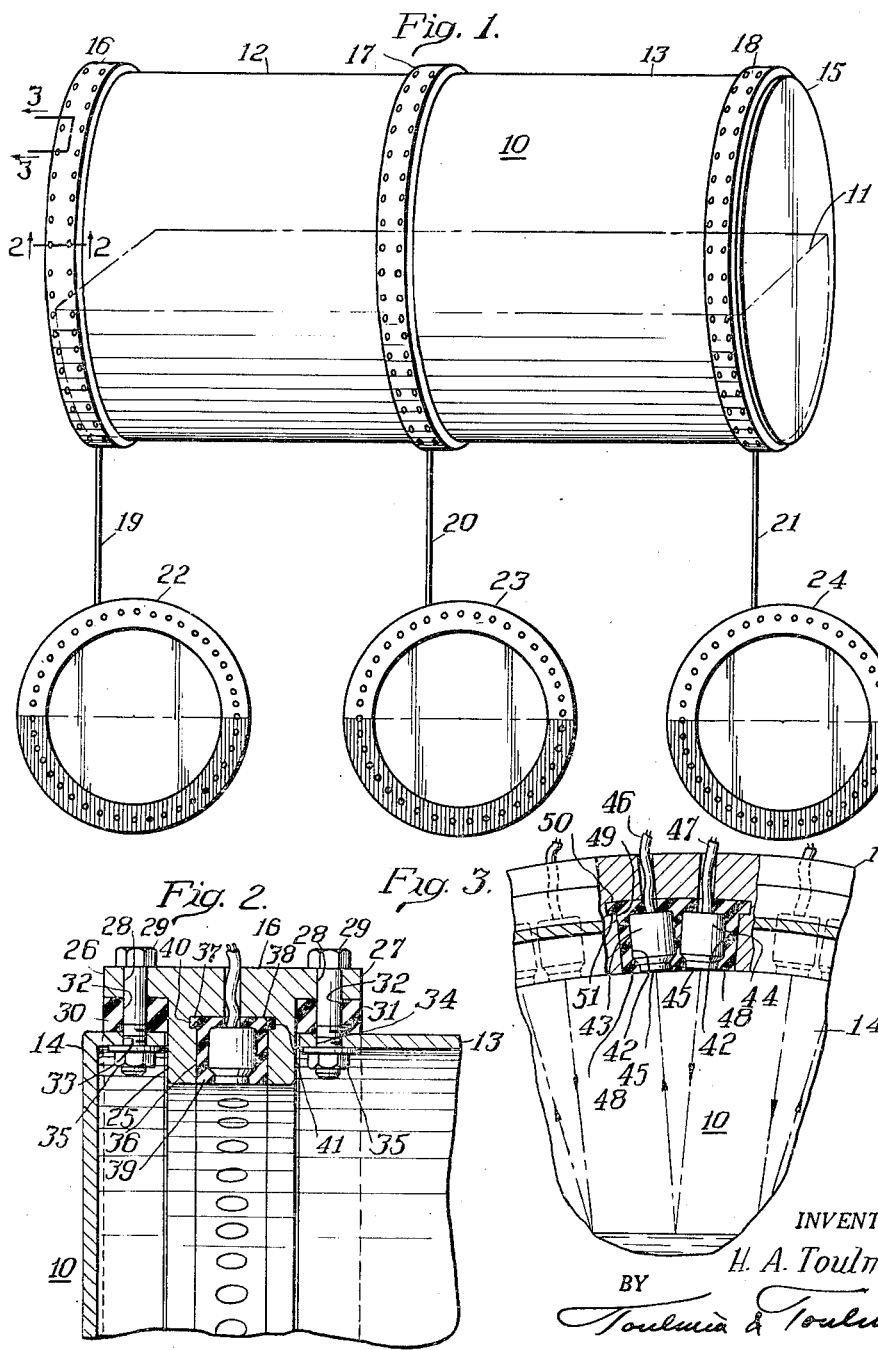

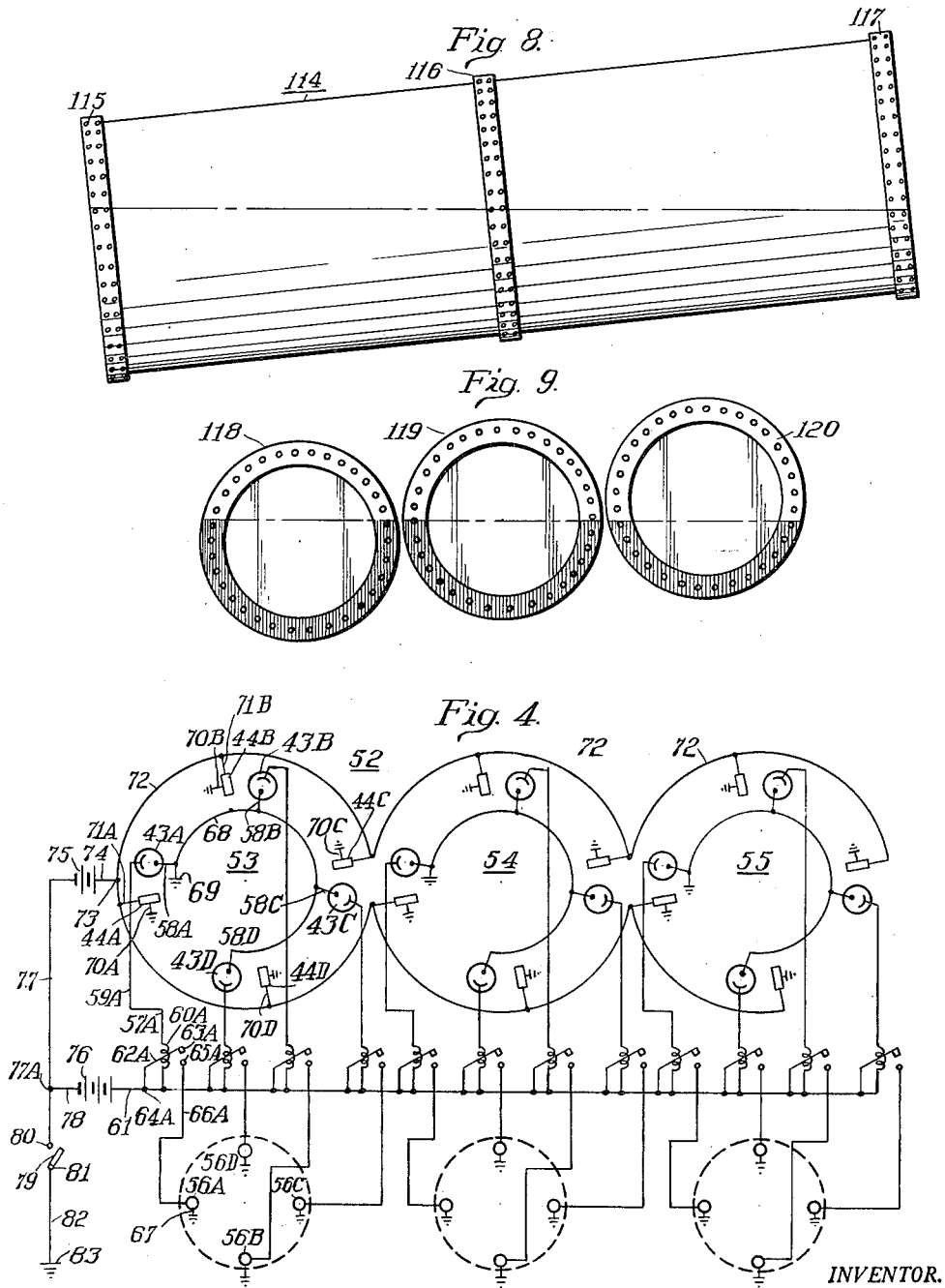

2,764,890

COMBINED LIQUID LEVEL GAUGE AND NAVIGATION AID

Harry A. Toulmin, Jr., Dayton, Ohio, assignor to The Commonwealth Engineering Company of Ohio, Dayton, Ohio, a corporation of Ohio Application February 10, 1954, Serial No. 409,497

19 Claims. (Cl. 73—178)

The present invention relates to a system for indicating the level of contents of a tank, more particularly to a liquid-level indicating system wherein photoelectric cells disposed within an illuminated tank act to illuminate an area of an indicating gauge in proportion to the liquid remaining in the tank.

It is the conventional practice to store liquids of all kinds in suitable containers or tanks. For many different reasons it is desirable to know at all times the exact level of the liquid in a storage tank. It is especially necessary to ascertain the amount of contents of a tank when such a tank is used for the storage of fuel which in turn is used to propel aircraft, automobiles, or the like. An empty fuel tank results in dire consequences in some situations.

Heretofore various systems have been devised in order to indicate the level of liquid in a tank. The conventional indicating system is basically mechanical in nature. In this system a float is used which in turn is connected by means of a linkage system to a suitable indicator. This system, while satisfactory in many respects, has the disadvantage that it has a number of moving parts the malfunction of any of which will give erroneous readings. Consequently it has been desirable to devise indicating systems in which the number of moving parts is reduced to an absolute minimum. Furthermore it has been desired to construct a tank level indicating system which not only is quite in operation and accurate in results but in addition gives an exact picture of the level of liquid within a tank, together with an indication of the amount of that liquid which remains in the tank.

The present invention discloses an improved tank level indicating system which incorporates the above-mentioned desired features. This system may be used with a liquid tank of any configuration. Means are provided to illuminate the interior of the tank. A number of closely-spaced photoelectric cells are mounted interiorly of the tank in a vertical cross-sectional plane. Each of these photoelectric cells is connected by means of a suitable electric circuit to an indicator light which is so positioned on an indicator dial as to correspond with the position of the respective photoelectric cell in the tank. Consequently the photoelectric cells in the empty portion of the tank will be energized by the illumination within the tank and will in turn actuate their respective indicating lights. The resulting pattern of lighted illuminating lights will give an exact picture at that moment of the level of liquid within the tank.

The tank level indicating system of this invention is particularly suited for use in aircraft. By using this system in aircraft not only is it possible to obtain a true reading of the fuel level in the tank but the system may be utilized also as an off-level flight indicator. This system may be satisfactorily used on tanks which are mounted on moving structures.

It is therefore the object of this invention to provide an improved tank level indicating system.

It is another object of this invention to provide a tank level indicating system having no moving parts within the tank.

It is an additional object of this invention to provide a tank level indicating system utilizing photoelectric cells within the tank.

It is a further object of this invention to provide a tank level indicating system wherein lights in the empty portion of a tank energize photoelectric cells which in turn actuate an indicating device.

It is still another object of this invention to provide an indicating device wherein a moving shutter casts a shadow on a calibrated screen to indicate the liquid level in a tank.

It is a still further object of this invention to provide a tank level indicating system which, when installed in aircraft, may be used as an off-level indicator.

Additional objects and advantages of this invention will become readily apparent upon reference to the accompanying description when taken in conjunction with the following drawings, wherein:

Figure 1 is a drawing in perspective of a tank with front elevational views of the connected indicators;

Figure 2 is a sectional view along the line 2—2 in Figure 1, showing the structure of the detector ring disclosed in this invention;

Figure 3 is a sectional view taken along the line 3—3 in Figure 1, and showing the arrangement of a photoelectric cell and a light in the detector ring;

Figure 4 is a circuit diagram of the indicator circuit used in the invention disclosed in Figure 1;

Figure 5 discloses a circuit diagram of another embodiment of an indicator circuit for this invention and also illustrates schematically another form of indicator device used in this invention;

Figure 6 is a front elevational view of the screen utilized in the indicator device illustrated in Figure 5;

Figure 7 is a vertical sectional view of a tank having a rectangular cross-section, and illustrating the manner in which this invention may be applied to a tank of this configuration;

Figure 8 is a side elevational view of a tank which is utilized as an off-level flight indicator for an aircraft; and Figure 9 is a front elevational view of the indicators connected to the tank disclosed in Figure 8 and used as an off-level flight indicator.

Returning now to the drawings, more particularly to Figure 1, wherein like reference characters indicate the same parts throughout the various views, 10 indicates generally a tank containing a body of liquid 11 therein, the level of which is desired to be indicated.

The tank 10 is cylindrical in cross-section and comprises cylindrical sections 12 and 13 and end sections 14 (not shown in Figure 1) and 15.

In accordance with this invention a detector ring 17, which will be described in detail later, is mounted between cylindrical sections 12 and 13. A detector ring 16, which is identical in structure to detector ring 17, is mounted between the extreme end of the cylindrical section 12 and an end section 14. A third detector ring 18, similar in construction to detector rings 16 and 17, is mounted between the extreme end of the cylindrical section 13 and an end section 15. The detector rings 16 through 18 are connected by means of multistrand cables 19, 20, and 21 respectively to indicator devices 22, 23, and 24 respectively. The circuits utilized and the indicator devices 22, 23, and 24 will be described in detail later.

Proceeding now to Figure 2, there is disclosed in Figure 2 a section of the detector ring 16. As each of the detector rings 16 through 18 is alike in structure and is mounted on the tank 10 in substantially the same manner only detector ring 16 will be described in detail. However, it is to be understood that this description applies equally to detector rings 16 and 18.

The detector ring 16 is annular in shape and has a substantially square cross-section. The detector ring is so mounted between the end section 14 and the cylindrical section 12 that a portion 25 of the detector ring 16 protrudes into the interior of the tank 10. Laterally extending flanges 26 and 27 are integrally mounted to the detector ring 16 in such a manner that the outer faces of the flanges 26 and 27 are flush with the outer face of the detector ring 16. Each of the flanges 26 and 27 has a plurality of spaced holes 28 therein to receive bolts 29. Annular gaskets 30 and 31 are disposed between the inner edges of the flanges 26 and 27 and the outer surfaces of the end section 14 and cylindrical section 12 in such a manner so as to determine the amount that the portion 25 protrudes into the interior of the tank 10. Each of the annular gaskets 30 and 31 has a plurality of spaced holes 32 therein which are so spaced as to be aligned with the holes 28 in the flanges 26 and 27. There are also holes 33 in the end section 14 and holes 34 in the cylindrical section 12, which also are spaced so as to be aligned with the holes 28 and 32. Consequently, when the bolts 29 are inserted through the aligned holes in the detector ring, gaskets, and end and cylindrical sections, and nuts 35 threaded on the bolts 29, it can be seen that not only is the detector ring securely fastened in position, but also the sections of the tank are united into a unit.

It should be pointed out that the detector ring may be fastened to the adjoining sections of a tank by means other than by the use of nuts and bolts as described herein. Any other suitable form of fastening means, such as riveting, welding, or the like, would be satisfactory. It is necessary, however, that the means of fastening the detector ring to the cylindrical sections be such that the possibility of leakage between the tank sections and the detector ring is eliminated.

There is an annular groove 36 made in the inner face of the detector ring 16. It is preferable that the annular groove 36 have undercut portions 37 and 38 at the bottom of the groove. A rubberlike mounting member 39 is inserted into the annular groove 36 and is securely held in place by ridges 40 and 41 which are received into the undercut portions 37 and 38. Mounted within suitable recesses 42 are a plurality of photoelectric cells 43 and lights 44. It is preferable that the photoelectric cells 43 and lights 44 be alternately arranged within the mounting member 39. The photoelectric cells 43 are of the type sensitive to light, and consequently they will act as electrical relays and will conduct an electric current when they are properly energized by the proper amount of illumination which may be received by said cells. Each of the photoelectric cells 43 and lights 44 is covered by a tightly fitting window 45. A lead 46 leads from each photoelectric cell, and a lead 47 leads from each light.

Figure 3 shows an alternative method of mounting the photoelectric cells and lights in the detector ring. In this method a series of rubberlike inserts 48 are placed in a like plurality of slotted recesses 49 made in the inner edge of the detector ring 16. In order to securely retain the rubber inserts 48 within the slotted recesses 49, an undercut 50 may be made along the bottom of each of the slotted recesses 49. This undercut 50 will then be adapted to receive a ridge 51 which is integrally formed on each of the rubber inserts 48.

While it is to be understood that either method may be satisfactorily used in practicing this invention, the method disclosed in Figure 2 may be preferred because of economies in machining the annular groove 36.

Proceeding now to Figure 4, there is illustrated therein the circuit diagram of the indicating system utilized in the invention as disclosed in Figure 1.

This indicator circuit is indicated generally as 52 and comprises detector ring circuits 53, 54, and 55, which are respectively associated with the detector rings 16, 17, and 18. It will be noted that the number of photoelectric cells and lights shown in each detector ring circuit is somewhat less than the number of photoelectric cells and lights in the detector ring 16 disclosed in Figure 2. For purposes of clarity these circuits have been shown for only four photoelectric cells and lights in each detector ring. Moreover, as the circuit connecting each photoelectric cell with a corresponding indicator light is the same for each corresponding pair of photoelectric cells and indicator lights, only one such circuit will be described in detail.

Detector ring circuit 53 which is associated with detector ring 16 comprises photoelectric cells 43A through 43D as shown in Figure 4. The photoelectric cells 43A through 43D are connected to indicator lights 56A through 56D respectively. The indicator lights 56 are located on the indicator device 22. A switch circuit designated generally as 57A is used to electrically connect photoelectric cell 43A with the indicator light 56A. One side of photoelectric cell 43A is grounded by means of a lead 58A and the other side of the photoelectric cell 43A is connected by means of a lead 59A to one side of a coil 60A. The other side of the coil 60A is electrically connected to a bus 61. The coil 60A is adapted to actuate a movable switch 62A which has a contact 63A on its free end. The other end of the switch 62A is electrically connected to the bus 61 at the point 64A. The contact 63A is adapted to electrically co-operate with a stationary contact 65A. Stationary contact 65A is connected by means of a lead 66A to the indicator light 56A. Indicator light 56A is grounded by means of the lead 67.

The ground lead 58A which leads from the photoelectric cell 43A is connected to a common ground wire 68, which is grounded at the point 69. Common ground wire 68 is electrically connected to the ground leads 58B through 58D.

The detector ring circuit 53 also discloses lights 44A through 44D. The lights 44A through 44D are individually grounded by means of the ground leads 70A through 70D respectively. The other side of the light 44A is connected by means of a lead 71A to a common lead 72. The common lead 72 is electrically connected to all of the lights 44 in the three detector ring circuits 53, 54, and 55. At the point 73 on the common lead 72 there is connected a lead 74 which leads to one side of a battery 75. A second battery 76 is electrically connected to the bus 61. A lead 77 connects the battery 75 with the junction point 77A, and the lead 78 connects the battery 76 with the junction point 77A. Junction point 77A is then electrically connected to one side of a throw switch 79 which comprises a stationary contact 80 and a movable contact arm 81. A ground lead 82 extends from the movable contact arm 81 and is grounded at a point 83.

It is pointed out that if conditions warrant a suitable amplifying circuit may be inserted into the switch circuit 57. This amplifying circuit would essential comprise an electronic amplifying tube and batteries.

It is also pointed out that the position of the photoelectric cells 43 and lights 44 in the detector ring circuits 53 through 55 has been inverted in Figure 4. Photoelectric cell 43D, which is shown in Figure 4 as being at the bottom of the circular arrangement of the photoelectric cells is actually on the top of the tank.

The photoelectric cells and corresponding lights have been shown in this inverted position in order that the circuits connecting the photoelectric cells with the indicating lighs may be considerably simplified.

With the above description of the structure and circuits involved in this invention in mind, the manner in which this invention functions to indicate the level of liquid within the tank will now be explained.

In order to simplify the explanation, consider the tank 10 to be equipped with the photoelectric cells 43A–D and lights 44A–D as shown in Figure 4. Bearing in mind that the photoelectric cell 43D is located at the top of the tank, it will be seen that when the tank is completely filled with liquid none of the light which is cast into the interior of the tank by the lights 44A–D will impinge on any of the photoelectric cells 43A–D. Consequently none of the switch circuits 57A–D will be energized and as a result each of the indicator lights 56A–D will be unlit. Since the tank is completely full, as pointed out above, the indicators 23 and 24 will be similarly darkened.

As soon as the level of liquid within the tank drops, the photoelectric cell 43D will be responsive to the light in the empty portion of the tank. This empty portion of the tank is of course illuminated by the light 44D. Immediately upon the impinging of this light upon the photoelectric cell 43D, said photoelectric cell will be energized. Consequently coil 60D will be energized and this will result in the switch 62D making contact with the stationary contact 65D. The engaging of the contacts 63D and 65D will result in the indicator light 56D being energized. As a result, the light 56D will be illuminated. As the indicator lights 56A and 56C are still darkened this will indicate that the level of liquid is between the top and mid-points of the tank 10.

Each of the photoelectric cells and its corresponding switch circuit will respond in the same fashion as light in the empty portion of the tank impinges upon that particular photoelectric cell. Consequently, as the level of liquid drops within the tank, a progressively greater number of photoelectric cells become uncovered by the liquid and these uncovered photoelectric cells will respond to the light in the empty portion of the tank. In this manner a true picture will be available at all times of the level of liquid within the tank. It will also be seen that as the photoelectric cells are spaced closer together about the inner periphery of the tank, a more accurate picture of the liquid level will be obtained.

Proceeding now to Figure 5, there is disclosed therein a modified form of an indicator circuit which may be used in this invention. In this modified circuit the responses from all of the photoelectric cells in all of the detector rings are integrated to give a single indication on a screen of the total quantity of liquid in the tank. The manner in which this is done will be presently described.

In order that this invention may be more clearly understood, the circuit shown in Figure 5 is for a plurality of photoelectric cells in single detector ring. It is to be understood that either a single detector ring or a plurality of detector rings could be employed. In using a single ring (as shown in Figure 5) the integrated responses from the cells therein will give an indication of the liquid level in the tank at that particular detector ring. When a plurality of detector rings are spaced the length of a tank, the integrated responses from all the cells carried by these rings will give a single indication on a suitable gauge of the quantity of liquid in the tank at any particular time.

In the modified circuit one side of the photoelectric cell 43A is grounded by means of the lead 44 and the ground 85. The other side of the photoelectric cell 43A is electrically connected to a coil 86 by means of a lead 87. The other side of the coil 86 is then connected by means of a lead 88 to a common bus 89. The coil 86 actuates a movable switch 90. The switch 90 comprises a movable contact arm 91, which is adapted to engage a stationary contact 92. The plurality of switches 90 which is actuated by one of the photoelectric cells 43 are connected in series. A plurality of resistors 93 are also connected in series. A plurality of cross connections 94 serve to connect each one of the switches 90 in parallel with a corresponding resistor 93. This resistor circuit 95 which comprises the switches 90 and resistors 93 has one side connected to a coil 96 which is adapted to actuate a pivoted movement 97. The other side of the coil 96 is connected by means of a lead 98 to one side of a battery 99. The other side of the battery is connected by means of a lead 100 to one side of the resistor circuit 95.

The movement 97 is a component of the indicator indicated generally as 101. Within the indicator 101 the pivoted movement 97 is connected by means of suitable linkage to a pivotally-mounted lever 102 which has at the free end thereof a shutter 103. There is a counterweight 104 on the other end of the lever 102.

A suitable light source 105 is positioned so as to throw a beam of light on a screen 106. The light source 105 and pivoted shutter 103 are so arranged in relation to each other that as the level of liquid within the tank gradually falls the pivoted shutter 103 will also fall so as to proportionately cut out more and more of the light cast from the light source 105. The resulting shadow 107 cast upon the screen 106 will then give an indication of the liquid within the tank 10.

In some situations it may be desirable to bias the pivoted movement 97 by means of springs 108 and 109.

In operation this circuit will function in the following manner. As the photoelectric cells 43 are disposed annularly about the wall of the tank 10 in the manner illustrated in Figure 4, when the tank is completely full, none of the photoelectric cells 43 will be energized. Although no lights are indicated in the circuit diagram of Figure 5, it is to be understood that the lighting of the interior of the tank 10 is to be accomplished in a similar manner as described above in connection with the circuit disclosed in Figure 4. Consequently all the switches 90 will be open, and each of the resistors 93 will be in circuit. The pivoted movement 97 and the shutter 103 are so calibrated that when all of the resistors 93 are in circuit the pivoted shutter will be in such a position that the light source 105 illuminates the entire screen 106. Consequently there will be no shadow on the screen 106 and this will indicate that the tank is full.

As the photoelectric cell 43A is uncovered by the dropping level of liquid, the coil 86 will energize, and this in turn will cause the switch 90 to close. This in turn will cut out the resistor 93A from the circuit. By cutting out the resistor 93A, the current in the resistor circuit 95 will increase. This inturn will cause a corresponding movement in the pivoted movement 97, which in turn through a suitable linkage system will cause the pivoted shutter 103 to cut off some of the light which is projected upon the screen 106 by the light source 105. The shutter will then cast a shadow 107 upon the screen 106. As indicated in Figure 6, the screen 106 is suitably calibrated at 110. Consequently the position of the shadow 107 on the calibrated screen as shown in Figure 6 will give an immediate indication of the liquid level within the tank.

As progressively more photoelectric cells are uncovered by the descending level of liquid, correspondingly more resistors will be cut out of the resistor circuit 95. This will result in the pivoted shutter 103 casting the shadow 107 lower and lower upon the screen 106 until the point is reached where all of the resistors are cut out of the circuit. This point, of course, is reached when the tank is empty. When the tank is empty, the shutter will cut off all light from the screen 106 and the resultant darkened screen will indicate that the tank is empty. With the cells being located in different rings along the tank, tilting of the tank will cause some cells to be darkened and others to be lighted, so that at all times an integrated reading is had of the total quantity in the tank.

Proceeding now to Figure 7, there is illustrated therein the method of arranging lights and photoelectric cells in a tank which has a substantially rectangular cross-section. A tank 111 has a plurality of lights 112 mounted in a vertical row along one side thereof. The lights 112 are so positioned as to be able to illuminate the entire interior of the tank 111. A plurality of closely spaced photoelectric cells 113 are arranged in a vertical row on the opposite wall of the tank 111. Consequently, as the level of the liquid within the tank 111 descends, a progressively larger number of photoelectric cells 113 will be uncovered. The responses of the uncovered photoelectric cells will then be employed to actuate an indicating circuit either of the nature disclosed in Figure 4 or the modified circuit illustrated in Figure 5.

It is also possible to satisfactorily use this invention as an off-level flight indicator for aircraft. This use of the invention is illustrated in Figures 8 and 9. The tank indicated generally as 114 is essentially of a construction similar to that of the tank disclosed in Figure 1. The tank 114 has detector rings 115, 116, and 117 which are placed and constructed in a manner similar to detector rings 16, 17, and 18 of Figure 1. The detector rings 115 through 117 are connected to indicator devices 118 through 120 respectively. The indicator devices 118 through 120 are similar to the indicator devices 22 through 24 employed in the invention disclosed in Figure 1. It is desirable that the indicator devices 118 through 120 be placed adjacent to each other in the manner illustrated in Figure 9.

When the aircraft in which the tank 114 is mounted banks to the left, so that the level of the liquid in the tank 114 is as illustrated in Figure 8, the indicator devices 118 through 120 will be illuminated in the manner shown in Figure 9. The indicator lights positioned on the indicator devices 118 through 120 are connected so that they function in the manner described in connection with the invention as disclosed in Figure 1. Therefore, as the liquid level shown on the indicator devices 118 through 120 is different for each of the indicator devices, it is readily determined that the aircraft is at an angle.

Should the aircraft ascend or descend, this also will be indicated on the indicator devices 118 through 120. In this case each of the indicator devices will be illuminated in substantially the same manner. In each of the indicator devices the indicated level will rotate about the indicator device in a manner corresponding to the position of the liquid within the tank 114. When used as an off-level flight indicator, it would be desirable that marks of some sort be placed upon each of the indicator devices to indicate the level position. Deviations from this level position would then indicate to trained observing personnel the exact degree that the aircraft is from the level position.

From the above description it can be seen that the tank level indicating device disclosed as this invention provides a novel and efficient method of indicating the level of liquid in a tank. When this invention is installed in aircraft, it will simultaneously indicate the level of liquid in the fuel tank and also the degree that the aircraft is from level flight position. This adaptability of the invention should render it especially suitable for installation in aircraft.

It will be understood that this invention is susceptible to modification in order to adapt it to different usages and conditions, and accordingly it is desired to comprehend such modifications within this invention as may fall within the scope of the appended claims.

What is claimed as this invention is:

1. In a system for indicating the level of contents in a tank having solid opaque walls, lighting means within said tank, a plurality of photoelectric cells along the interior surface of said tank walls in a vertical plane thereof, and indicating means actuated by said photoelectric cells to indicate the level of the contents of the tank.

2. In a system for indicating the level of contents of a tank, lighting means mounted within said tank, a plurality of photoelectric cells disposed in a vertical bank about the inner periphery of said tank, and indicating means actuated by said photoelectric cells to indicate the level of the contents within said tank.

3. In a system for indicating the level of contents of a tank, a plurality of lights disposed in a vertical band within said tank, a plurality of photoelectric cells positioned alternately with said lights, and indicating means actuated by said photoelectric cells to indicate the level of contents within said tank.

4. In a system for indicating the level of contents of a tank, said tank being comprised of a plurality of cylindrical sections; a detector ring mounted between the ends of adjacent sections, each said ring comprising a plurality of lights spaced thereon to illuminate said tank; a plurality of photoelectric cells alternately spaced with said lights in a vertical band; and indicating means actuated by said photoelectric cells to indicate the level of the contents within said tank.

5. In a system for indicating the level of contents of a tank, said tank having a plurality of lighting means and a plurality of photoelecetric cells mounted in a vertical band therein; a plurality of indicating lights corresponding to the plurality of photoelectric cells; and electric circuit means connecting said photoelectric cells and said indicating lights whereby energization of said photoelectric cells will close said circuit means to light said indicating lights.

6. In a system for indicating the level of contents of a tank, lighting means disposed within said tank, a plurality of photoelectric cells disposed in a vertical band within said tank, a plurality of relays and each said relay actuated by one of said photoelectric cells, a plurality of contact switches each of which is actuated by one of said relays, and a plurality of indicating lights each of which is actuated by one of said switches.

7. In a system for indicating the level of contents of a tank, lighting means mounted within said tank, a plurality of photoelectric cells disposed in a ring in a vertical plane of said tank whereby a greater number of photoelectric cells becomes uncovered as the level of contents drops, a plurality of relays respectively actuated by said photoelectric cells, a plurality of contact switches respectively actuated by said relays, and a plurality of indicating lights respectively actuated by said switches.

8. In a system for indicating the level of contents of a tank; lighting means mounted within said tank; a plurality of photoelectric cells disposed in a ring in a vertical plane of said tank whereby a greater number of photoelectric cells becomes uncovered as the level of contents within the tank drops; a plurality of relays respectively actuated by said photoelectric cells; a plurality of contact switches respectively actuated by said relays; a plurality of indicating lights corresponding to said plurality of photoelectric cells and arranged substantially in a circle, each of the indicating lights being connected to the corresponding photoelectric cell, whereby the unlit indicating lights will indicate the level of contents within said tank.

9. In a system for indicating the level of contents of a tank, said tank having solid opaque walls having a plurality of lighting means therein and photoelectric cells along the interior surface of said tank walls in a vertical plane thereof, a plurality of resistors connected in series, said plurality of resistors being of like plurality as said photoelectric cells; a plurality of relays respectively actuated by said photoelectric cells; a plurality of contact switches respectively actuated by said relays, said switches being connected in series whereby said resistors respectively are cut out of circuit when a corresponding switch is closed; and indicating means actuated by said series circuit to indicate the level of the contents of the tank.

10. In a system for indicating the level of contents of a tank having solid opaque walls, said tank having a plurality of lighting means therein and photoelectric cells along the interior surface of said tank walls in a vertical plane thereof, a plurality of resistors connected in series, said plurality of resistors being of like plurality as said photoelectric cells; a plurality of relays respectively actuated by said photoelectric cells; a plurality of contact switches respectively actuated by said relays, each of said switches being connected in circuit in order to cut out its corresponding resistor when said contact switch is closed;

a pivoted lever actuated by said series circuit, the degree of movement of said lever being in direct proportion to the resistors cut out of circuit; a pivotally mounted shutter; linkage connecting said shutter and lever; a light source; a screen; said light source, shutter and screen being so positioned that a shadow of the shutter formed by said light source is projected on said screen; and said screen being calibrated to indicate the level of contents within said tank.

11. In a system for indicating the level of contents of a tank having solid opaque walls, lighting means within the tank, and a plurality of photoelectric cells along the interior surface of said tank walls in a vertical plane thereof, an indicating device comprising circuit means responsive to the level of contents within said tank as indicated by said photoelectric cells, a movement actuated by said circuit, a pivotally mounted shutter, linkage connecting said shutter to said movement, a light source, a screen so positioned whereby movement of said shutter projects a shadow thereof on said screen, and said screen calibrated whereby said shadow indicates the level of contents within said tank.

12. In a cylindrical tank having a plurality of horizontal sections, a detector ring member, said ring being mounted between adjacent sections, the inner edge of said ring projecting into said tank, a plurality of lights spaced on the inner edge of said ring, and a plurality of photoelectric cells on the inner edge of said ring alternately spaced with said lights.

13. In a clindrical tank, a vertical ring-like member positioned so as to form a portion of the wall of said tank, the inner edge of said ring projecting into said tank, light means mounted on the inner edge of said ring, and photoelectric cells mounted on the inner edge of said ring.

14. In a cylindrical tank having a plurality of sections, a ring-like member mounted between adjacent edges of adjoining sections, a flange on the outer peripheral edge of said ring, means of fastening said outer flange to said tank, the inner edge of said ring-like member projecting into said tank, an annular groove in the inner edge of said ring, gasket means disposed within said annular groove, a plurality of lights rigidly secured within said gasket means, and a plurality of photoelectric cells rigidly secured to said gasket means and alternately spaced with said lights.

15. In a system for indicating the level of contents of a tank, said tank having a rectangular cross-section; a row of light means mounted vertically on an interior vertical wall of said tank; a row of closely spaced photoelectric cells similarly mounted on the opposite vertical wall of said tank; and indicating means actuated by said photoelectric cells whereby the photoelectric cells above the liquid level are responsive to light and thereby indicate the level of contents within said tank.

16. In a system for indicating the quantity of liquid in a tank; an electrically operated indicating gauge, a source of electrical energy connected with the gauge, current controlling means between the source and the gauge, a plurality of photoelectric cells in the tank distributed in a vertical plane about the periphery and along the length thereof, means for illuminating the interior of the tank so those photoelectric cells that are above the liquid in the tank are activated, and means connected with said photoelectric cells responsive to activation thereof for influencing said current controlling means to change the reading of said gauge.

17. An arrangement according to claim 16 in which the current controlling means consists of serially connected resistors, one for each photoelectric cell, and the means connected with the photoelectric cells responsive to the activation thereof comprising shunting switches connected across the resistors and operated between open and closed positions by the energy controlled by said photoelectric cells.

18. A system for indicating the off-level position of an aircraft, said system comprising a tank having a liquid therein partially filling said tank, a plurality of photoelectric cells mounted in a vertical band along the interior surface of said tank, a plurality of lights mounted within said tank in a vertical plane thereof, and indicating means actuated by said cells, said indicating means having reference marking thereon designating the line of thrust and lateral axis whereby deviation from said marks as shown by the indicating means will reveal the off-level position of the aircraft with respect to its line of thrust and lateral axis.

19. A system for indicating the off-level position of an aircraft with respect to both its line of thrust and lateral axis, said system comprising a normally horizontal substantially cylindrical tank with liquid partially filling said tank, a plurality of lights disposed in a vertical ring on an interior wall of said tank, a plurality of photoelectric cells spaced alternately of said lights, a plurality of indicating lights positioned in a circle, there being reference marks on said circle corresponding to the line of thrust and lateral axis of the aircraft, each of said indicating lights actuated by a correspondingly arranged photoelectric cell thereby indicating the position of the level of liquid within said tank whereby deviation of the level from the reference marks will reveal the altitude of the aircraft with respect to its line of thrust and lateral axis.

References Cited in the file of this patent
UNITED STATES PATENTS 2,091,303      Brelsford _____ Aug. 31, 1937